United States Patent
Tsuruta et al.

(10) Patent No.: US 10,690,095 B2
(45) Date of Patent: Jun. 23, 2020

(54) AIR INTAKE DUCT

(71) Applicant: HINO MOTORS, LTD., Hino-shi (JP)

(72) Inventors: Tomoyuki Tsuruta, Hino (JP); Takuya Hasebe, Hino (JP); Yuta Yamamoto, Hino (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 15/770,596

(22) PCT Filed: Nov. 14, 2016

(86) PCT No.: PCT/JP2016/083654
§ 371 (c)(1),
(2) Date: Apr. 24, 2018

(87) PCT Pub. No.: WO2017/086261
PCT Pub. Date: May 26, 2017

(65) Prior Publication Data
US 2019/0055907 A1    Feb. 21, 2019

(30) Foreign Application Priority Data

Nov. 19, 2015  (JP) ................................ 2015-226520
Nov. 19, 2015  (JP) ................................ 2015-226521

(51) Int. Cl.
*F02M 35/10*     (2006.01)
*F02M 35/16*     (2006.01)
(Continued)

(52) U.S. Cl.
CPC ....... *F02M 35/10262* (2013.01); *B60K 13/02* (2013.01); *F02M 35/088* (2013.01);
(Continued)

(58) Field of Classification Search
CPC .......... F02M 35/10262; F02M 35/088; F02M 35/10; F02M 35/10013; F02M 35/10104;
(Continued)

(56) References Cited

U.S. PATENT DOCUMENTS

| 6,361,574 B1 * | 3/2002 | Decker ................. B01D 45/14 55/317 |
| 2012/0252343 A1 * | 10/2012 | Kimura .................. B29C 49/20 454/143 |
| 2014/0150384 A1 * | 6/2014 | Bunnell ............... F02M 35/088 55/332 |

FOREIGN PATENT DOCUMENTS

| DE | 10 2011 101 765 A1 | 11/2012 |
| DE | 11 2011 100 387 T5 | 12/2012 |

(Continued)

OTHER PUBLICATIONS

International Search Report dated Jan. 24, 2017 in PCT/JP2016/083654 filed Nov. 14, 2016.
(Continued)

*Primary Examiner* — Syed O Hasan
(74) *Attorney, Agent, or Firm* — Oblon, McClelland, Maier & Neustadt, L.L.P.

(57) ABSTRACT

A vertically extending air intake duct on a rear of a cab in a delivery vehicle to take in ambient air for an engine through an air intake has a duct body as an outer shell with the air intake on an upper portion; a side branch section on a lower portion of the body and having upper and lower ends opened in the body and outside, respectively; a mesh member extending over the air intake to collect rainwater; a louver for covering the mesh member and the air intake to prevent intrusion of matter other than ambient air; and a drip channel or bead on an inner wall of the duct body and just
(Continued)

below the mesh member to capture and guide rainwater flowing down on the inner wall to the upper end of the side branch section.

15 Claims, 8 Drawing Sheets

(51) Int. Cl.
*B60K 13/02* (2006.01)
*F02M 35/08* (2006.01)

(52) U.S. Cl.
CPC ...... *F02M 35/10* (2013.01); *F02M 35/10013* (2013.01); *F02M 35/10104* (2013.01); *F02M 35/16* (2013.01); *F02M 35/164* (2013.01)

(58) Field of Classification Search
CPC .. F02M 35/16; F02M 35/164; F02M 35/0226; F02M 35/024; F02M 35/0216; F02M 35/10078; B60K 13/02
See application file for complete search history.

(56) References Cited

FOREIGN PATENT DOCUMENTS

| | | | | |
|---|---|---|---|---|
| JP | 62-193166 | U | 12/1987 | |
| JP | 2-115025 | U | 9/1990 | |
| JP | 5-32765 | U | 4/1993 | |
| JP | 8-170567 | A | 7/1996 | |
| JP | 11-105553 | A | 4/1999 | |
| JP | 2002-317720 | A | 10/2002 | |
| JP | 2011132914 | * | 7/2011 | ............. F02M 35/16 |
| JP | 5325764 | B2 | 10/2013 | |
| WO | WO 2017/183269 | A1 | 10/2017 | |

OTHER PUBLICATIONS

European Search Report issued in European Patent Application No. 16866263.3 dated May 16, 2019, citing references AO-AR therein.

* cited by examiner

AIR INTAKE DUCT

TECHNICAL FIELD

The present invention relates to an air intake duct.

BACKGROUND ART

It is generally preferable that a truck or other large-sized delivery vehicle traveling on unpaved rough roads more often than an ordinary passenger car has an engine which takes in not air near the ground containing plenty of dust but clean air at a sufficient height above the ground. Further, for fear of splashing rainwater or snow near the ground being taken in together, it is preferable to ensure that the engine takes in only the air at the sufficient height above the ground.

To these ends, as exemplarily shown in FIG. 1, mounted on a rear of a cab a in the large-sized delivery vehicle is an air intake duct b which extends vertically. This kind of air intake duct b comprises a duct body d as an outer shell with an air intake c opened on an upper portion of the duct body to take in ambient air as intake air for an engine, and a louver e which covers the air intake c to prevent intrusion of matter other than the ambient air.

In the air intake duct b, the air intake c is opened wide backward of the vehicle and, as shown, may be opened also on a laterally outer right side of the vehicle. With such structure having the air intake c opened on the adjacent two sides, even if a hood for a cargo bed covers and conceals a rear of the air intake duct b, the air intake c can be prevented from being completely concealed. Thus, the engine can be prevented beforehand from being accidentally fired due to failed intake of the ambient air.

There exists, for example, below-mentioned Patent Literature 1 showing state-of-art technology pertinent to this kind of air intake duct.

CITATION LIST

Patent Literature

Patent Literature 1: JP 5325764 B2

SUMMARY OF INVENTION

Technical Problems

In the conventional structure as mentioned above, as typically shown in FIG. 2, the ambient air taken in through the air intake c opened wide backward of the vehicle has main currents (arrows A in FIG. 2) which collide with and flow down along a surface in the duct body d opposite to the air intake c. Rainwater taken in together with the ambient air flow separates from the intake ambient air flow due to inertia and attaches on the opposite surface and flows down therefrom along the inner wall of the duct body d. Thus, a drip channel f must be arranged just below the surface in the duct body d opposite to the air intake c, and collision of the main currents in the intake ambient air with the drip channel disadvantageously brings about substantial increase in intake resistance.

In the typically illustrated FIG. 2, the drip channel f is shown by itself for the sake of convenience in explanation. However, of course, it may be integrally formed with a portion, for example, of embedded inner partitions for partitioning an interior of the duct body d into flow passages or of reinforcing skeleton members.

The invention was made in view of the above and has its object to prevent collision of the main currents in the ambient air taken in through the air intake with the drip channel, thereby attaining reduction in intake resistance.

Solution to Problems

The invention is directed to an air intake duct extending vertically and mounted on a rear of a cab in a delivery vehicle for taking in ambient air as intake air for an engine through an air intake, characterized in that it comprises a duct body as an outer shell with said air intake opened on an upper portion thereof, a side branch section on a lower portion of said duct body and having an upper end opened into the duct body and a lower end opened outside, a mesh member extending over said air intake to capture rainwater, a louver for covering said mesh member and said air intake to prevent intrusion of matter other than the ambient air and a drip channel on an inner wall of said duct body just below said mesh member for capturing the rainwater flowing down along said inner wall to guide the rainwater to the upper end of said side branch section.

In this manner when the ambient air taken in through the air intake passes through the louver, rainwater entrained on the intake ambient air flow is captured by the mesh member, flows down to the inner wall of the duct body just below the mesh member and is captured by the drip channel. The captured rainwater is guided by the drip channel to the upper end of the side branch section, flows down in the side branch section and discharges outside through the lower end of the section.

As a result, the main currents of the ambient air taken in through the air intake and colliding with the surface opposing to the air intake contains no rainwater. Thus, there is no need of arranging the drip channel just below the surface in the duct body opposite to the air intake; the drip channel may be arranged on the inner wall just below the mesh member where no main currents in the intake ambient air pass, thereby preventing collision of the main currents in the ambient air taken in through the air intake with the drip channel and attaining the reduction in intake resistance.

It is preferable in the invention that the inner wall in the duct body just below the mesh member is formed with a bead as the drip channel concaved outward to provide a groove with a descending slope to the upper end of the side branch section. Thus, the rainwater flowing down along the inner wall in the duct body just below the mesh member enters into the groove provided by the bead due to surface tension, is guided to the upper end of the side branch section due to the descending slope of the bead and flows down in the side branch section. Thus, while keeping the function as the drip channel, projection inward of the duct body can be averted to attain further reduction in intake resistance; moreover, formation of the bead can contribute to increasing strength of the duct body.

It is further preferable in the invention that beads are formed in vertically at least two stages. Thus, rainwater not received in the groove provided by the bead at a first stage may be received in the groove provided by the bead at a second or subsequent stage; thus, more reliable withdrawal of the rainwater can be attained and increase in number of beads can contribute to further increasing the strength of the duct body.

In the invention and where the air intake on the upper portion of the duct body are opened on adjacent two sides, it is preferable that louver boards covering relatively wide-opened one of the adjacent two sides of the air intake are arranged slantwise such that a lateral posture of each thereof provides a descending slope to a border between the adjacent two sides. Thus, the ambient air taken in through the relatively wide-opened one of the adjacent two sides of the air intake is curved in flow, due to the slanted arrangement of each of the louver boards, into a direction preventing the collision with the ambient air flow taken in through the adjacent side, thereby preventing the collision of the ambient air flows taken in through the adjacent two sides of the air intake to attain substantial reduction in intake resistance.

It is preferable in the invention that louver boards covering the relatively narrow-opened one of the adjacent two sides of the air intake are also arranged slantwise such that a lateral posture of each thereof provides a descending slope to the border between the adjacent two sides of the air intake. Thus, both of the ambient air flows taken in through the adjacent two sides of the air intake are curved in directions away from each other, thereby attaining further reliable prevention of the collision.

It is preferable in the invention that the slanted arrangement of each of the louver boards is within an angular range of more than 0° and less than 30° with respect to horizontal. Thus, reliably keepable is inherent performance in the louver of preventing intrusion of matter such as rainwater or snow other than the ambient air.

Specifically, excessively slanted arrangement of each of the louver boards might bring about easy intrusion of matter such as rainwater or snow other than the ambient air, which would hinder the inherent performance of the louver. The slanted arrangement of each of the louver boards in the angular range of more than 0° and less than 30° does not substantially hinder the inherent performance of the louver.

Advantageous Effects of Invention

The air intake duct according to the invention can exhibit excellent advantages as mentioned in the following.

(I) There is no need of arranging the drip channel on the surface in the duct body opposite to the air intake; the drip channel may be arranged on the inner wall just below the mesh member where no main currents of the intake ambient air pass. Thus, collision of the main currents in the ambient air taken in through the air intake with the drip channel can be prevented to attain reduction in intake resistance, thereby substantially improving fuel consumption of the engine to an extent unattainable in the prior art.

(II) When the bead is formed as the drip channel concaved outward on the inner wall of the duct body just below the mesh member to provide the groove with the descending slope to the upper end of the side branch section, projection inward of the duct body is avoided while keeping the function as the drip channel, whereby further reliable reduction in intake resistance can be attained and formation of the bead can contribute to increasing the strength of the duct body.

(III) When employed is the structure comprising the beads in vertically at least two stages, rainwater not received in the groove provided by the bead at the first stage may be received in the groove provided by the bead at the second or subsequent stage, whereby further reliable withdrawal of the rainwater can be attained and increase in number of the beads can contribute to further increasing the strength of the duct body.

(IV) When the air intake on the upper portion of the duct body is opened on the adjacent two sides, the louver boards covering relatively wide-opened one of the adjacent two sides of the air intake may be arranged slantwise such that the lateral posture of each thereof provides the descending slope to the border between the adjacent two sides. Then, collision of the ambient air flows taken in through the adjacent two sides of the air intake can be prevented to attain reduction in intake resistance, thereby further improving the fuel consumption of the engine.

(V) When the louver boards covering the relatively narrow-opened one of the adjacent two sides of the air intake are also arranged slantwise such that the lateral posture of each thereof provides the descending slope to the border between the adjacent two sides of the air intake, then both of the ambient air flows taken in through the adjacent two sides of the air intake are curved in directions away from each other, thereby attaining further reliable prevention of the collision.

(VI) When the slanted arrangement of each of the louver boards is within the angular range of more than 0° and less than 30° with respect to horizontal, reliably keepable is inherent performance in the louver of preventing intrusion of matter such as rainwater or snow other than the ambient air.

DESCRIPTION OF EMBODIMENTS

Embodiments of the invention will be described in conjunction with the drawings.

Figure 1:
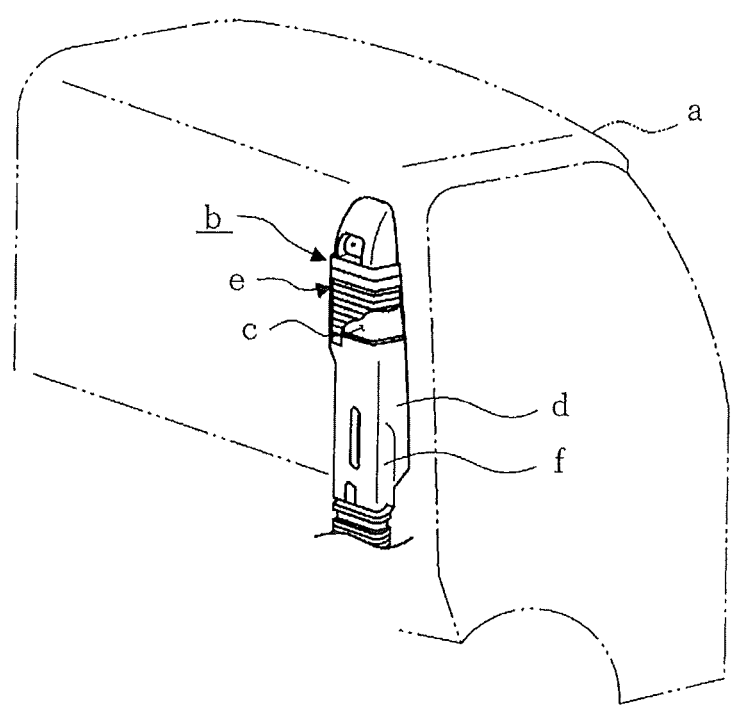
FIG. 1 is a perspective view showing a conventional example.
Figure 2:
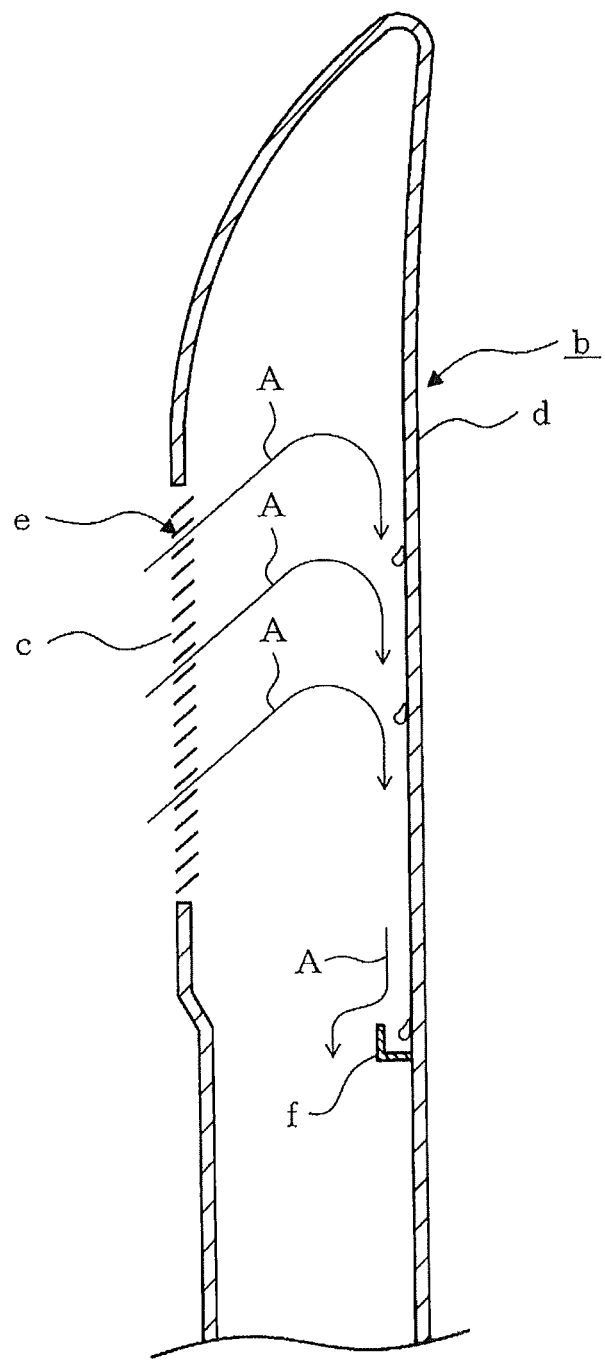
FIG. 2 is a typical diagram showing currents of ambient air taken into the air intake duct in FIG. 1.
Figure 3:
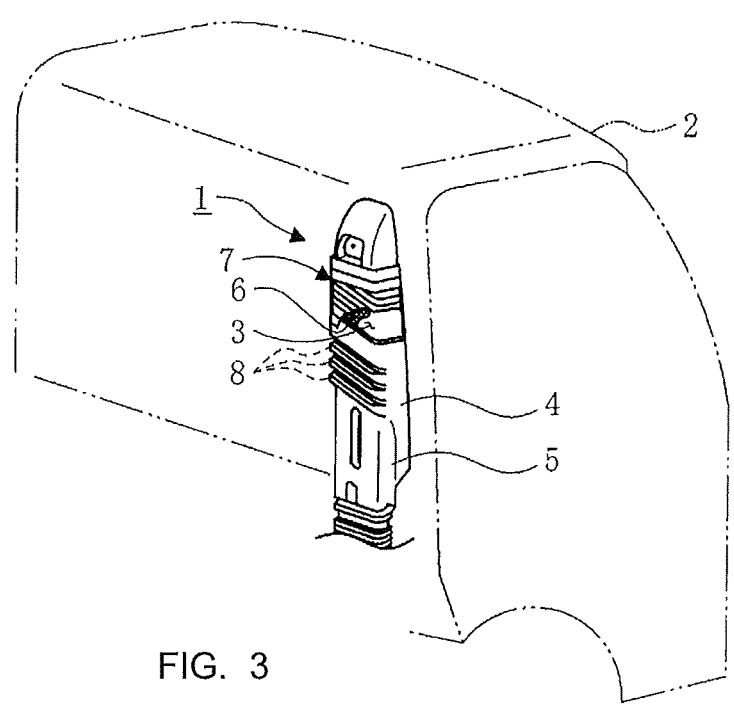
FIG. 3 is a perspective view showing an embodiment of the invention.
Figure 4:
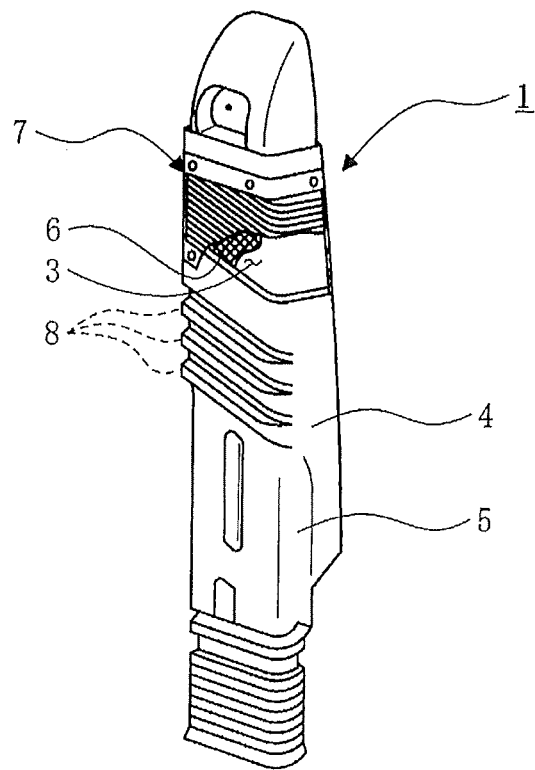
FIG. 4 is an enlarged view showing details of the air intake duct in FIG. 3.
Figure 5:
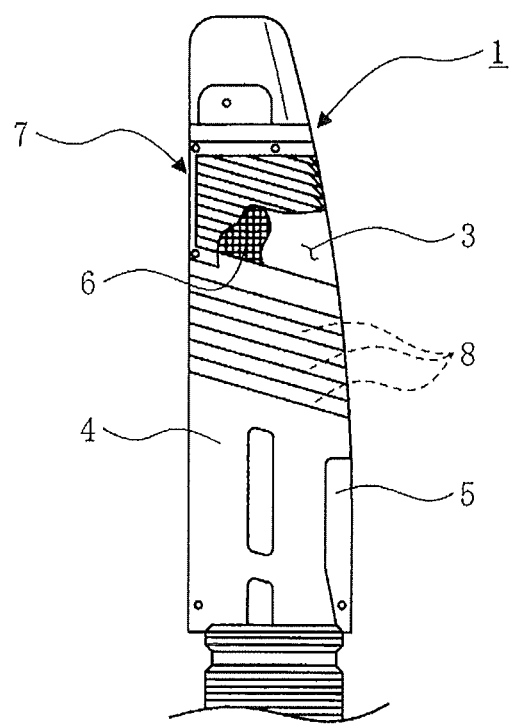
FIG. 5 is a view looking the air intake duct in FIG. 4 from backward of the vehicle.
Figure 6:
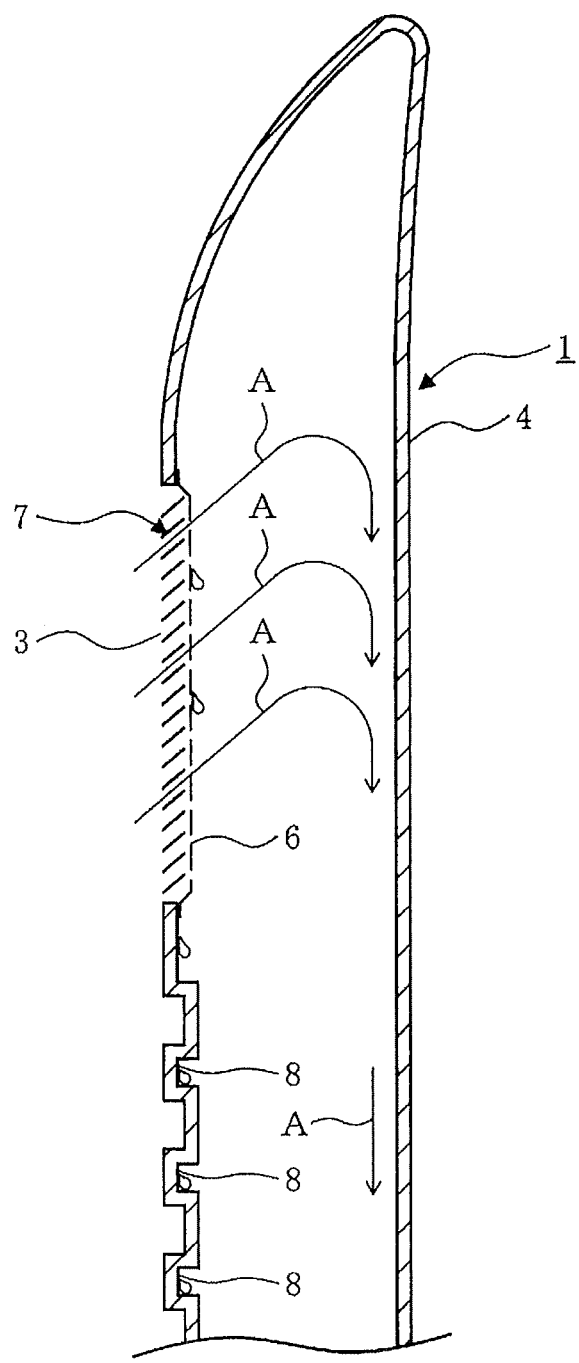
FIG. 6 is a typical diagram showing currents of ambient air taken into the air intake duct in FIG. 4.

FIGS. 3-8 and 11 show an embodiment of the invention. As shown in FIGS. 3-8 and 11 and just like the conventional intake duct b exemplified in FIG. 1, an air intake duct 1 according to the embodiment is mounted on a rear of a cab 2 in a delivery vehicle (see FIG. 3) to extend vertically and is adapted to take in ambient air as intake air for an engine through an air intake 3 opened wide backward of the vehicle and opened also on a laterally outer right side of the vehicle. Thus, even if a hood for a cargo bed covers and conceals a rear of the air intake duct 1, the air intake 3 is prevented from being completely concealed.

The embodiment is characterized in that it comprises a duct body 4 as an outer shell with the air intake 3 opened on an upper portion thereof, a side branch section 5 formed on a lower portion of the duct body 4 and having an upper end opened into the duct body 4 and a lower end opened outside through a drainage port (not shown), a mesh member 6 extending over the air intake 3 to capture rainwater, a louver 7 for covering the mesh member 6 and the air intake 3 to prevent intrusion of matter other than the ambient air and a drip channel on an inner wall of the duct body 4 just below the mesh member 6 for capturing the rainwater flowing down along the inner wall to guide the rainwater to the upper end of the side branch section 5. In the embodiment illustrated, formed on the inner wall of the duct body 4 just blow the mesh member 6 are beads 8 as drip channels in vertically three stages and concaved outward to provide grooves each with a descending slope to the upper end of the side branch section 5.

The mesh member 6 may be made from metal or resin. Important is a fact that meshes have high porosity to minimize increasing in intake resistance and are not excessively rough to ensure reliable capture of the rainwater.

In this manner the ambient air taken in through the air intake 3 passes through the louver 7 so that the rainwater entrained in the ambient air flow is captured by the mesh member 6, flows down along an inner wall of the duct body 4 just below the mesh member 6 into the grooves provided by the beads 8 due to surface tension, is guided due to slant of the beads 8 into the upper end of the side branch section 5 and discharges outside through the lower end thereof.

As a result, main currents of the air (arrows A in FIG. 6) taken in through the air intake 3 and colliding with the surface opposed to the air intake 3 contains no rainwater; there is no need of arranging a drip channel or channels on the inner surface of the duct body 4 just below the surface opposite to the air intake 3. The beads 8 as drip channels are arranged on the inner wall just below the mesh member 6 where no main currents of the intake ambient air pass. Thus, the collision of the main currents of the ambient air taken in through the air intake 3 with the drip channels is prevented to attain reduction in intake resistance.

Figure 11:
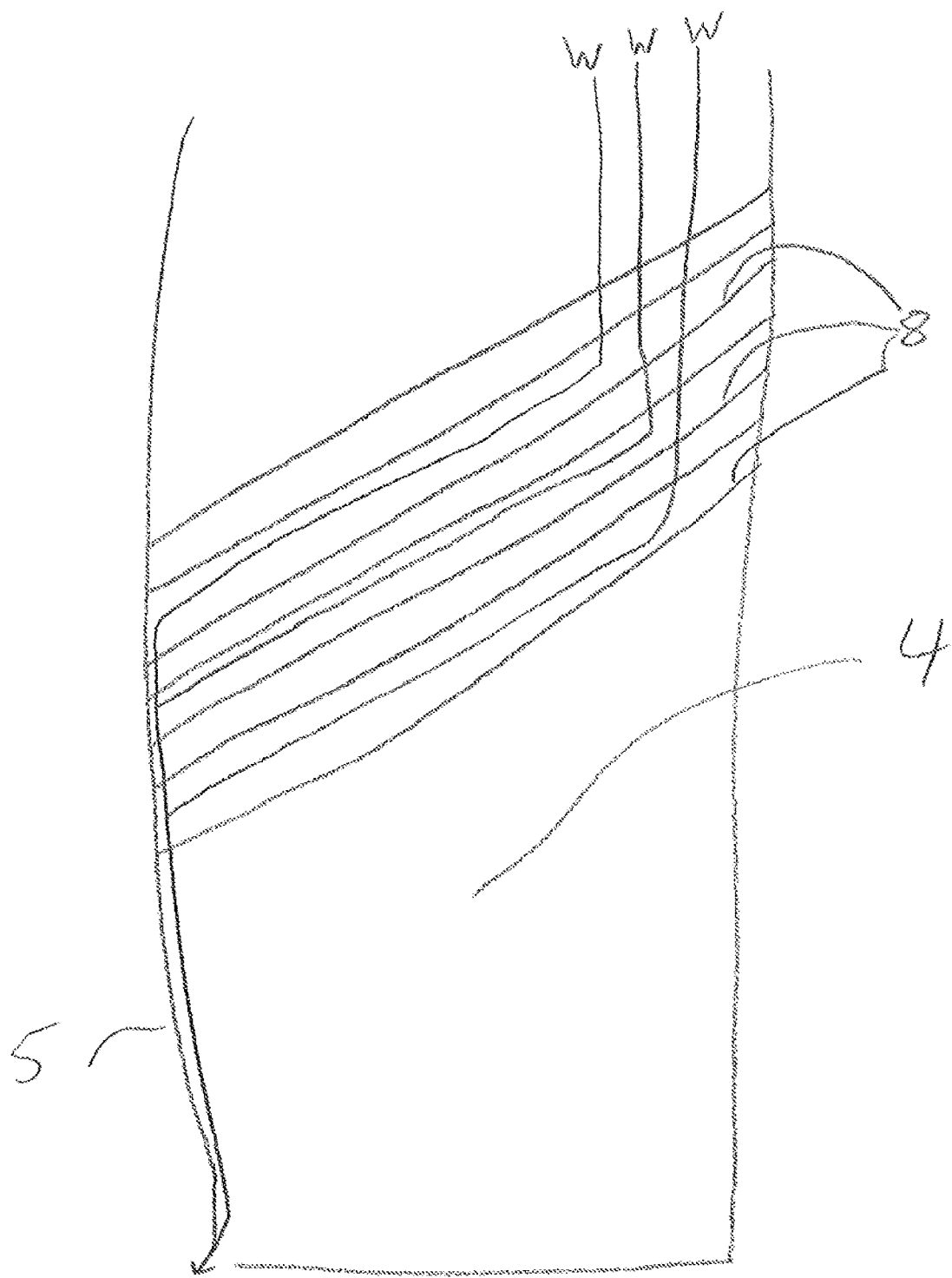
FIG. 11 is a view showing the flow of rainwater.

Specifically in the embodiment, the beads 8 as the drip channels are concaved outside to provide grooves each with a descending slope to the upper end of the side branch section 5 so that the rainwater W flows into the grooves provided by the beads 8, is guided due to slant of the beads 8 into the upper end of the side branch section 5 and discharges outside through the lower end thereof (FIG. 11). Thus, while keeping the performance as the drip channels, projection inward of the duct body 4 can be averted to further attain reduction in intake resistance and formation of the bead 8 can contribute to increasing the strength of the duct body 4.

Moreover, the beads 8 in the embodiment are formed in vertically three stages so that rainwater not received in the groove provided by the bead 8 at the first stage may be received in the groove provided by the bead 8 at the second or subsequent stage, whereby further reliable withdrawal of the rainwater can be attained and increase in number of the beads 8 can contribute to further increasing the strength of the duct body 4.

The beads 8 thus concaved outside to provide the grooves can be utilized as drip channels with no problem since the new provision of the mesh member 6 enables the rainwater to be captured on the side of the air intake 3 and thus makes it possible to invert the positions of the drip channels (beads 8). Generally, a side opposite to the air intake 3, which is a side for installation to the rear of the cab, has difficulty in outside concave; by contrast, the side of the air intake 3 may be easily concaved outside.

As mentioned in the above, according to the embodiment, there is no need of arranging the drip channel or channels just below the surface opposite to the air intake 3 in the duct body 4; the bead or beads 8 as the drip channel or channels may be arranged on the inner wall just below the mesh member 6 where no main currents of the ambient air pass. Thus, collision of the main currents of the ambient air taken in through the air intake 3 with the drip channel or channels can be avoided to attain reduction in intake resistance, thereby substantially improving the fuel consumption of the engine to an extent unattainable in the prior art.

Further, when the drip channel or channels are provided on the inner wall in the duct body 4 just below the mesh member 6, projection inward of the duct body 4 can be avoided to attain further reduction in intake resistance and formation of the bead or beads 8 can contribute to increasing the strength of the duct body 4 while keeping the performance as the drip channel or channels. Especially in the embodiment, rainwater not received in the groove by the bead 8 at the first stage can be received in the groove provided by the bead 8 at the second or subsequent stage to attain further reliable withdrawal of the rainwater and increase in number of the beads 8 can contribute to further increasing the strength of the duct body 4.

Further, the embodiment also resides in that the air intake 3 on the upper portion of the duct body 4 and opened on the adjacent two sides, the louver boards 7a of the louver 7 covering relatively wide-opened one of the adjacent two sides of the air intake 3 are arranged slantwise such that a lateral posture (posture in a horizontal direction perpendicular to an intake direction of the ambient air) of each of the boards provides a descending slope to a border between the adjacent two sides.

Figure 7:
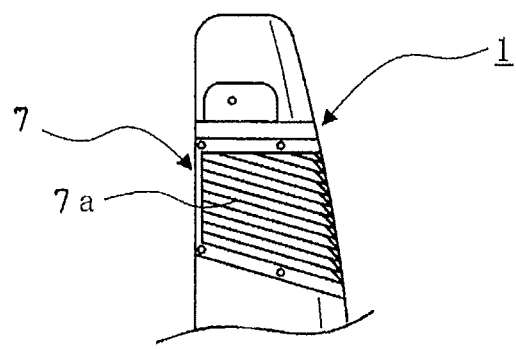
FIG. 7 is a view showing without cutout the louver of the air intake duct in FIG. 5.

Specifically, in the embodiment illustrated, the duct body 4 has a rectangular cross-section flattened laterally of the vehicle with the air intake 3 opened relatively wide on the rear side and opened also on the laterally right side. In the louver 7 covering the air intake 3 opened on the adjacent rear and laterally right sides, especially as shown in FIG. 7, the louver boards 7a covering the rear side are arranged slantwise such that the lateral posture of each thereof provides a descending slope to the border between the rear and laterally right sides.

In this case, it is preferable that the slanted arrangement of each of louver boards 7a of the louver 7 covering the rear side of the air intake 3 is within an angular range of more than 0° and less than 30° with respect to horizontal. Specifically, in the embodiment illustrated, the slanted arrangement with inclined angle of about 15° or so is employed; in the illustration, the louver boards 7b of the louver 7 covering the laterally right side of the air intake 3 are arranged horizontally just like the prior art.

In order to attain inherent performance of preventing invasion of matter other than the ambient air, each of the louver boards 7a and 7b of the louver 7 has an inclined angle to provide an ascending angle in the intake direction of the ambient air. It is a matter of course that, with such inclined angle in the intake direction of the ambient air being kept, the louver boards 7a on the rear side are arranged laterally slantwise.

Figure 8:
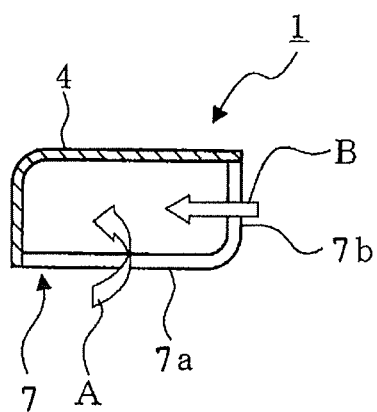
FIG. 8 is a typical diagram showing the ambient air flows taken into the air intake duct in FIG. 4 through two sides of the duct.

In this manner, as typically shown in FIG. 8, the ambient air taken in through the relatively wide-opened rear side among the adjacent rear and laterally right sides of the air intake 3 (arrow A in FIG. 8) is curved in flow, due to the slanted arrangement of each of the louver boards 7a of the louver 7, into a direction preventing the collision with the ambient air taken in through the adjacent laterally right side (arrow B in FIG. 8), whereby the collision of the flows of the air intake 3 taken in through the adjacent rear and laterally right sides is prevented to attain substantial reduction in intake resistance.

Furthermore, specifically in the embodiment, each of the louver boards 7a of the louver is slantly arranged in an angular range of more than 0° and less than 30° with respect to horizontal so that inherent performance of the louver can be surely retained to prevent intrusion of matter such as rainwater or snow other than the ambient air.

Specifically, excessively slanted arrangement of each of the louver boards 7a of the louver 7 might bring about easy intrusion of matter such as rainwater or snow other than the ambient air, which would hinder the inherent performance of the louver 7. The slanted arrangement of each of the louver boards 7a of the louver 7 in the angular range of more than 0° and less than 30° does not substantially hinder the inherent performance of the louver 7.

Thus, according to the embodiment, the louver boards 7a of the louver 7 covering the relatively wide-opened rear side of the air intake 3 are arranged slantwise so that the collision of the ambient air flows taken in through the adjacent rear and laterally right sides of the air intake 3 can be averted to attain reduction in intake resistance. Thus, the fuel consumption of the engine can be substantially improved to an extent unattainable by the prior art and reliably keepable is the inherent performance in the louver 7 of preventing intrusion of matter such as rainwater or snow other than the ambient air.

Figure 9:
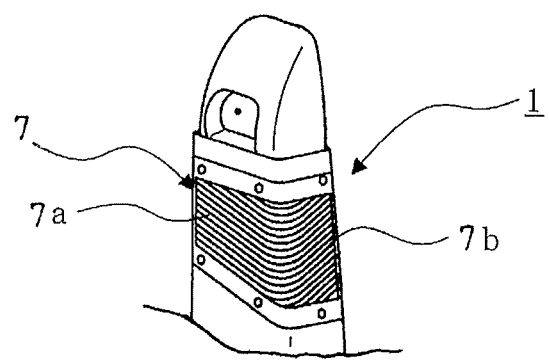
FIG. 9 is an enlarged view showing a further embodiment of the invention.
Figure 10:
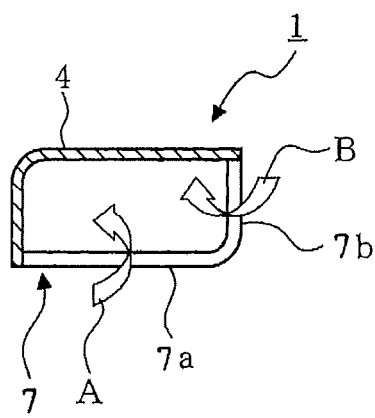
FIG. 10 is a typical diagram showing the ambient air flows taken into the air intake duct in FIG. 9 through the two sides of the duct.

FIG. 9 shows a further embodiment of the invention in which the louver boards 7b of the louver 7 covering the relatively narrow-opened laterally right side of the air intake 3 are also arranged slantwise to provide a lateral posture with a descending slope to the border between the adjacent rear and laterally right sides of the air intake 3. Thus, typically shown in FIG. 10, both of the ambient air flows taken in through the adjacent rear and laterally right sides of the air intake 3 (arrows A and B in FIG. 10) are curved to directions away from each other to attain further reliable prevention of the collision.

It is to be understood that an air intake duct according to the invention is not limited to the above embodiments and that various changes and modifications may be made without departing from the scope of the invention. For example, the drip channels may not be necessarily provided by the beads; drip channels may be in the form of gutters in a portion, for example, of embedded inner partitioning member for partitioning the interior of the duct body into flow passages or of reinforcing skeleton members.

REFERENCE SIGNS LIST 1 air intake duct
2 cab
3 air intake
4 duct body
5 side branch section
6 mesh member
7 louver
7a louver board
7b louver board
8 bead (drip channel)

The invention claimed is:

1. An air intake duct mounted on a rear of a cab in a delivery vehicle to extend vertically to take in ambient air as intake air for an engine through an air intake, the air intake duct comprising:

a duct body as an outer shell with said air intake opened on an upper portion thereof;
a side branch section on a lower portion of said duct body and having an upper end opened into the duct body and a lower end opened outside;
a mesh member extending over said air intake to capture rainwater;
a louver arranged outside of the mesh member for covering said mesh member and said air intake to prevent intrusion of matter other than the ambient air; and
a drip channel on an inner wall of said duct body just below said mesh member for capturing the rainwater flowing down along said inner wall to guide the rainwater to the upper end of said side branch section,
wherein the rainwater captured by said mesh member falls in drops along the inner wall just below said mesh member into the drip channel.

2. The air intake duct as claimed in claim 1, wherein the inner wall in the duct body just below the mesh member is formed with a bead as the drip channel which concaves outward to provide a groove with a descending slope to the upper end of the side branch section.

3. The air intake duct as claimed in claim 2, wherein beads are formed in vertically at least two stages.

4. The air intake duct as claimed in claim 1, wherein the air intake on the upper portion of the duct body is opened on adjacent two sides, louver boards covering relatively wide-opened one of the adjacent two sides of said air intake being arranged slantwise such that a lateral posture of each thereof provides a descending slope to a border between said adjacent two sides.

5. The air intake duct as claimed in claim 2, wherein the air intake on the upper portion of the duct body is opened on adjacent two sides, louver boards covering relatively wide-opened one of the adjacent two sides of said air intake being arranged slantwise such that a lateral posture of each thereof provides a descending slope to a border between said adjacent two sides.

6. The air intake duct as claimed in claim 3, wherein the air intake on the upper portion of the duct body is opened on adjacent two sides, louver boards covering relatively wide-opened one of the adjacent two sides of said air intake being arranged slantwise such that a lateral posture of each thereof provides a descending slope to a border between said adjacent two sides.

7. The air intake duct as claimed in claim 4, wherein louver boards covering the relatively narrow-opened one of the adjacent two sides of the air intake are also arranged slantwise such that a lateral posture of each thereof provides a descending slope to the border between the adjacent two sides of said air intake.

8. The air intake duct as claimed in claim 5, wherein louver boards covering the relatively narrow-opened one of the adjacent two sides of the air intake are also arranged slantwise such that a lateral posture of each thereof provides a descending slope to the border between the adjacent two sides of said air intake.

9. The air intake duct as claimed in claim 6, wherein louver boards covering the relatively narrow-opened one of the adjacent two sides of the air intake are also arranged slantwise such that a lateral posture of each thereof provides a descending slope to the border between the adjacent two sides of said air intake.

10. The air intake duct as claimed in claim 4, wherein slanted arrangement of each of the louver boards is in an angular range of more than 0° and less than 30° with respect to horizontal.

11. The air intake duct as claimed in claim 5, wherein the slanted arrangement of each of the louver boards is in an angular range of more than 0° and less than 30° with respect to horizontal.

12. The air intake duct as claimed in claim 6, wherein the slanted arrangement of each of the louver boards is in an angular range of more than 0° and less than 30° with respect to horizontal.

13. The air intake duct as claimed in claim 7, wherein the slanted arrangement of each of the louver boards is in an angular range of more than 0° and less than 30° with respect to horizontal.

14. The air intake duct as claimed in claim 8, wherein the slanted arrangement of each of the louver boards is in an angular range of more than 0° and less than 30° with respect to horizontal.

15. The air intake duct as claimed in claim 9, wherein the slanted arrangement of each of the louver boards is in an angular range of more than 0° and less than 30° with respect to horizontal.

\* \* \* \* \*